June 12, 1956  E. O. THORNROS  2,750,145
GATE VALVE

Filed Sept. 8, 1950  2 Sheets-Sheet 1

INVENTOR.
ERIC OLOF THORNRÖS
BY
ATTORNEY

INVENTOR.
ERIC OLOF THORNRÖS

United States Patent Office 2,750,145
Patented June 12, 1956

2,750,145

GATE VALVE

Eric O. Thornros, Stockholm, Sweden

Application September 8, 1950, Serial No. 183,720

Claims priority, application Sweden February 14, 1950

3 Claims. (Cl. 251—197)

The present invention relates to a gate valve for controlling the flow of fluid through a pipe line, and more particularly to a gate valve for controlling the flow of hot and cold fluid through the pipe.

It has been found that the design of a gate valve suitable not only for the control of the flow of cold fluids but also for the control of the flow of hot fluids presents considerable difficulties. The principal reason for these difficulties is that the gate members of the valves tend to freeze against the respective mating surfaces of the valve seat when the pipe line is cooled off. A further difficulty encountered in the design of gate valves is to design the valve so that it remains reasonably tight even though the fluid to be controlled carries with it solid impurities which tend to collect on the mating surfaces.

Accordingly, one of the objects of the present invention is to provide a novel and improved gate valve which is suitable for the control of hot and cold fluids without danger of freezing of the gate members against the respective mating surfaces when the pipe line in which the valve is installed, is cooled off.

Another object of the invention is to provide a novel and improved gate valve which has a self-cleaning action so that it remains permanently reasonably tight even though the fluid to be controlled contains solid impurities.

Further objects, features and advantages of the invention will be pointed out hereinafter and set forth in the appended claims forming part of the application.

In the accompanying drawings a preferred embodiment of the invention is shown by way of illustration and not by way of limitation.

Figure 1:
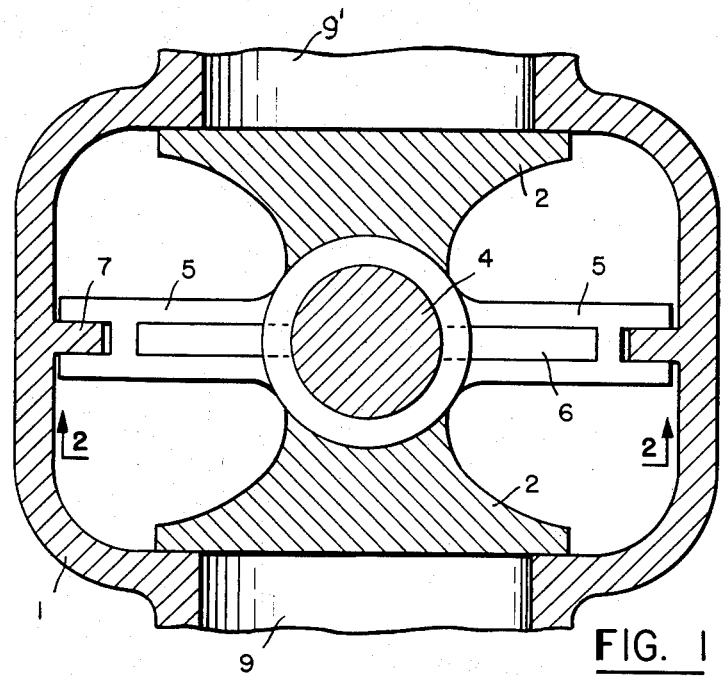
Fig. 1 is a cross-section through a gate valve according to the invention.
Figure 2:
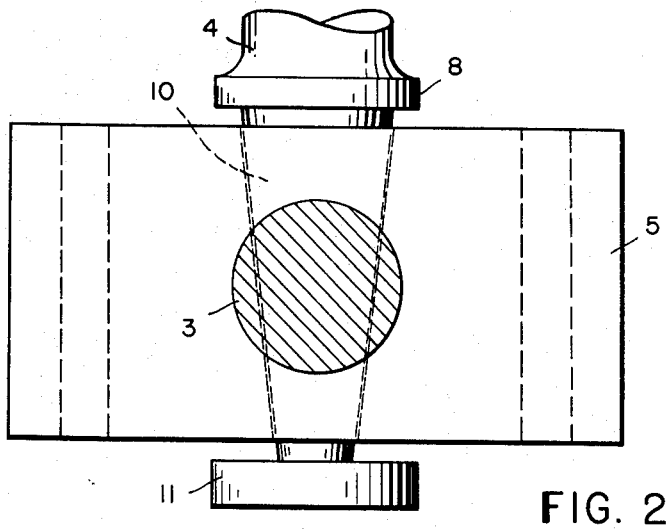
Fig. 2 is a fragmentary section taken on line 2—2 of Fig. 1 on a reduced scale, the valve casing being omitted.

Referring now to the figures in detail, the gate valve according to the invention comprises a valve casing 1 including a valve chamber 12. This chamber communicates with the inlet 9 and outlet 9' respectively and is formed with oppositely disposed gate seats. A pair of gate discs 2 are engageable with the gate seats. The gate discs are movable between the illustrated valve closing position and a valve opening position by lifting and lowering respectively the gate discs within chamber 12. The position of the gate discs is controlled by the valve mechanism. This mechanism is shown as comprising a rectangular plate member 5 which is disposed within the valve chamber parallel with the gate discs and lengthwise relative thereto. The middle part of the sides of the plate member forms a central boss 5' including a cone-shaped bore. Plate member 5 is joined to the gate discs 2 by narrow bridges 3 extending between the mid-part of said boss and the mid-parts of the gate discs. As can best be seen, the plate member 5 has through its entire width a longitudinal inner slot 6. This slot extends through the part of the plate member forming the boss and has an uninterrupted length at least equal to the diameter of the gate discs. The plate member 5 is further formed with two outer slots extending throughout the entire width thereof. These outer slots are engaged by ribs 7 on the interior wall of the valve casing for guiding the gate discs into the gate opening and gate closing position respectively.

The narrow bridges 3 and the inner slot 6 lend to the gate discs a certain resiliency transversely and at an angle to the plane of displacement thereof.

The valve mechanism further comprises a valve stem slidably extended into the valve chamber and ending in a conical part 10. This conical part fits the bore tightly in one axial position of the stem relative to the bore thereby preventing a resilient displacement of the gate disc and provides clearance in another axial position of the stem relative to the bore thereby permitting a resilient displacement of the gate discs. An upper flange 8 and a lower flange 11 limit the up and down movement of stem 4 relative to the plate member 5.

Figure 3:
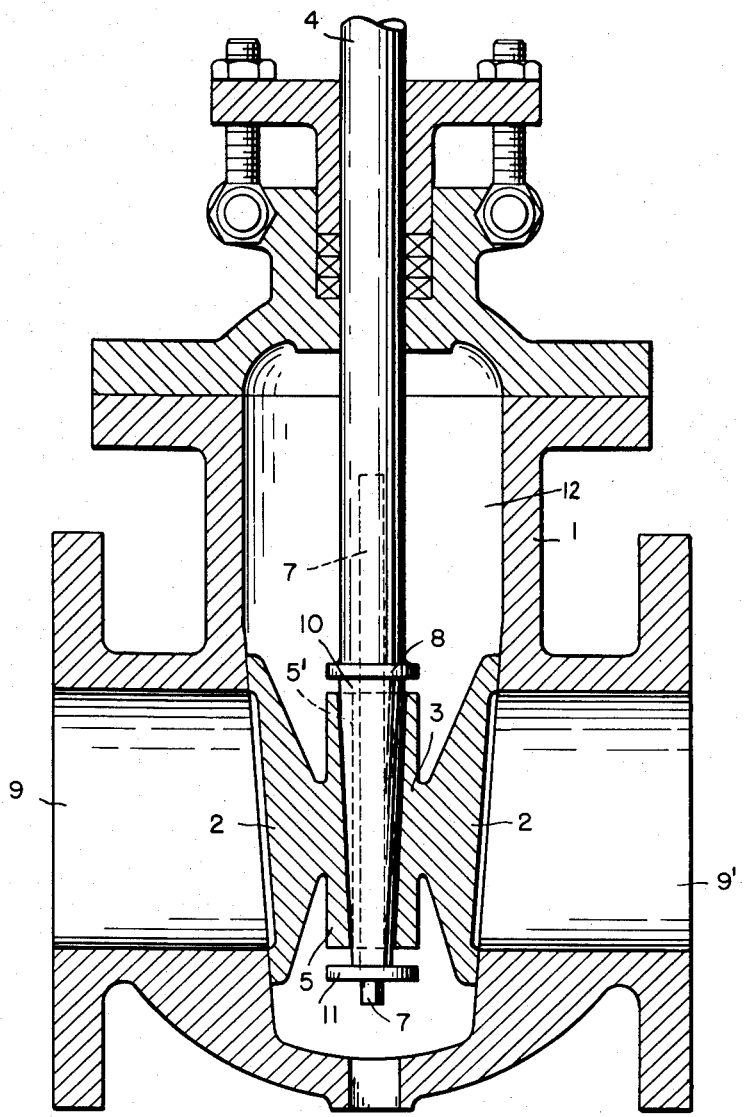
Fig. 3 is an elevational sectional view of the gate valve according to Fig. 1.

The function of the gate vlave as hereinbefore described is as follows. The valve is shown in Fig. 3 in a position in which gate discs 2 are in the valve closing position, but flange 8 is raised above the upper rim of boss 5'. In this position of the valve stem or more specifically of conical part 10 clearance is left between part 10 and the bore in boss 5'. As a result, the valve discs are resilient and can seat themselves tightly upon the seats. To close the valve fully stem 4 is moved further down until flange 8 abuts against the upper edge of boss 5'. In this position part 10 fills the bore in boss 5' thereby locking the gate discs in position. In the event that one of the gate discs does not close tightly due to solid particles between the face of the respective disc and the valve seat, the other disc can still close tightly since due to the resiliency of the two discs each disc can vary within certain limits its position of slant relative to the other disc. As is apparent, closing of one gate disc will shut off the flow of fluid through the valve. Furthermore, the resiliency of the discs tends to force out any accumulations of solid particles between the valve seats and the faces of the gate discs.

When it is desired to open the valve, stem 4 is lifted. When the stem has reached the position shown in Fig. 3 in which flange 8 is lifted clear of boss 5' but flange 11 has not yet engaged the lower edge of boss 5' resiliency is restored to the gate discs so that the fluid pressure on the respective side on the valves will loosen the gate disc under pressure. This permits readily to withdraw the gate discs into the gate opening position by engagement of flange 11 with the other end of boss 5' upon further lifting of stem 4.

What is claimed is:

1. A gate valve for controlling the flow of hot and cold fluids through a pipe line, comprising a valve casing including a valve chamber formed with oppositely disposed gate seats, a pair of gate discs engageable with said gate seats, a generally rectangular plate member disposed within said valve chamber parallel with said gate discs and lengthwise relative thereto, the middle part of the sides of said plate member forming a central boss including a cone-shaped bore, the said plate member being joined to said gate discs by narrow bridges extending between the mid part of said boss and the mid parts of said gate discs, the said plate member having through its entire width a longitudinal inner slot and two longitudinal outer slots, the latter slots extending from the short edges of the plate member, two guide ribs on interior wall portions of the casing defining said chamber, each of said ribs slidably engaging one of said outer slots for guiding the gate discs into the gate opening and gate closing position respectively thereof, the said inner slot extending through the part of the plate member forming said boss and having an uninterrupted length at least equal to the diameter of said gate discs, the said narrow bridges and the said inner slot providing resiliency of the discs transversely and at an angle to the plane of displacement thereof, a valve stem slidably extended into said valve chamber and operatively coupled with said plate member for displacement of the gate discs, a conical member supported on the end of the valve stem and seated in said conical bore, the said conical member fitting the said bore tightly in one axial position relative to the bore thereby preventing a resilient displacement of the gate discs and providing clearance between the conical member and the bore in another axial position of the conical member thereby permitting the said resilient displacement of the gate discs.

2. A gate valve as defined in claim 1 and also limit means on the valve stem disposed above and below the said boss, the said limit means being axially spaced so as to provide for axial displacement of the conical member between a position preventing the aforesaid resilient displacement of the gate discs and a position permitting the said resilient displacement, the limit means below the boss being engageable with the latter for moving the gate discs into the positions opening the gate seats.

3. A valve gate as defined in claim 2, wherein the said limit means are formed by flanges extending from the valve stem above and below the boss respectively, and axially so spaced that the valve stem is moveable from the position of a tight fit of the conical member with the bore to the position of clearance between the conical member and the bore before the lower flange engages the boss for displacement of the gate discs.

References Cited in the file of this patent

UNITED STATES PATENTS

| 1,624,465 | Black | Apr. 12, 1927 |
| 1,936,873 | Glab | Nov. 28, 1933 |
| 2,075,123 | Lunken | Mar. 30, 1937 |
| 2,193,922 | Heheman | Mar. 19, 1940 |
| 2,204,452 | Seppelfricke | June 11, 1940 |

FOREIGN PATENTS

| 2,769 | Great Britain | of 1884 |

OTHER REFERENCES

Ser. No. 319,423, Vervoort (A. P. C.), published May 25, 1943.